US010826694B2

(12) United States Patent
Camenisch et al.

(10) Patent No.: US 10,826,694 B2
(45) Date of Patent: Nov. 3, 2020

(54) METHOD FOR LEAKAGE-RESILIENT DISTRIBUTED FUNCTION EVALUATION WITH CPU-ENCLAVES

(71) Applicant: International Business Machines Corporation, Armonk, NY (US)

(72) Inventors: Jan L. Camenisch, Zurich (CH); Manu Drijvers, Adliswil (CH); Anja Lehmann, Rueschlikon (CH); Kai Wilhelm Samelin, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 15/959,788

(22) Filed: Apr. 23, 2018

(65) Prior Publication Data
US 2019/0327088 A1  Oct. 24, 2019

(51) Int. Cl.
*H04L 9/14* (2006.01)
*H04L 9/32* (2006.01)
(Continued)

(52) U.S. Cl.
CPC ............... *H04L 9/14* (2013.01); *H04L 9/008* (2013.01); *H04L 9/0861* (2013.01);
(Continued)

(58) Field of Classification Search
CPC ......... H04L 9/14; H04L 9/3247; H04L 9/008; H04L 9/0894; H04L 9/0861;
(Continued)

(56) References Cited

U.S. PATENT DOCUMENTS 6,304,658 B1   10/2001  Kocher et al.
6,539,092 B1    3/2003  Kocher
(Continued)

FOREIGN PATENT DOCUMENTS

EP    2 721 763 B1   11/2016

OTHER PUBLICATIONS

Michel Abdalla, Sonia Belaid, and Pierre-Alain Fouque. Leakage-resilient symmetric encryption via re-keying. ICAR Cryptology ePrint Archive, 2015:204, 2015.
(Continued)

*Primary Examiner* — Michael R Vaughan
(74) *Attorney, Agent, or Firm* — Harrington & Smith

(57) ABSTRACT

The present disclosure relates to a method for using a secret key for cryptographically processing a data item in an enclave enabled system. The method comprises: computing a first set of shares of the secret key and storing them in an encrypted format. Each encrypted share may be sent to respective component in a first set of components. In response to sending the encrypted shares, a modified encryption of the respective share may be received from each of the first set of components. Each of the received modified encryptions may be encrypted and the resulting modified share is sent to the respective first set of components. In response to sending the decrypted modified shares, a data item cryptographically processed using the respective share may be received from each of the first set of components. The received data items may be combined to obtain a cryptographically processed data item.

16 Claims, 5 Drawing Sheets

(51) Int. Cl.
  *H04L 9/00*  (2006.01)
  *H04L 9/08*  (2006.01)
  *H04L 29/06*  (2006.01)
(52) U.S. Cl.
  CPC .......... *H04L 9/0894* (2013.01); *H04L 9/3247* (2013.01); *H04L 9/002* (2013.01); *H04L 63/0428* (2013.01)
(58) Field of Classification Search
  CPC . H04L 63/0428; H04L 9/002; H04L 63/0435; H04L 9/085
  See application file for complete search history.

(56) References Cited

U.S. PATENT DOCUMENTS

| | | | | |
|---|---|---|---|---|
| 8,006,300 | B2* | 8/2011 | Mizrah | G06F 21/36 726/18 |
| 8,341,758 | B2 | 12/2012 | Kim et al. | |
| 8,386,800 | B2 | 2/2013 | Kocher et al. | |
| 8,781,111 | B2 | 7/2014 | Qi et al. | |
| 8,954,728 | B1 | 2/2015 | Juels et al. | |
| 8,966,264 | B2* | 2/2015 | Morioka | H04L 9/003 713/170 |
| 9,906,505 | B2* | 2/2018 | Peeters | H04L 9/302 |
| 10,084,596 | B1* | 9/2018 | Triandopoulos | H04L 9/0891 |
| 2003/0093684 | A1 | 5/2003 | Kaiserswerth et al. | |
| 2004/0117649 | A1* | 6/2004 | Whyte | H04L 9/0891 380/286 |
| 2005/0002532 | A1* | 1/2005 | Zhou | H04L 9/302 380/277 |
| 2008/0044010 | A1* | 2/2008 | Vasyltasov | H04L 9/3066 380/28 |
| 2008/0219437 | A1* | 9/2008 | Ebeid | G06F 7/726 380/30 |
| 2013/0247230 | A1* | 9/2013 | Parann-Nissany | H04L 9/008 726/30 |
| 2013/0259226 | A1* | 10/2013 | Ciet | H04L 9/0631 380/44 |
| 2014/0310527 | A1* | 10/2014 | Veugen | H04L 9/065 713/171 |
| 2016/0072779 | A1 | 3/2016 | Medwed et al. | |
| 2016/0269186 | A1* | 9/2016 | Wallrabenstein | G06F 21/31 |
| 2017/0155634 | A1* | 6/2017 | Camenisch | H04L 9/085 |
| 2019/0013937 | A1* | 1/2019 | Leong | H04L 63/06 |
| 2020/0076594 | A1* | 3/2020 | Audley | H04L 9/085 |

OTHER PUBLICATIONS

Rikke Bendlin, Ivan Damgard, Claudio Orlandi, and Sarah Zakarias. Semihomomorphic encryption and multiparty computation. In Kenneth G. Paterson, editor, Advances in Cryptology—EUROCRYPT 2011—30th Annual International Conference on the Theory and Applications of Cryptographic Techniques, Tallinn, Estonia, May 15-19, 2011. Proceedings, vol. 6632 of Lecture Notes in Computer Science, pp. 169-188. Springer, 2011.

Dan Boneh, Eu-Jin Goh, and Kobbi Nissim. Evaluating 2-dnf formulas on ciphertexts. In Joe Kilian, editor, Theory of Cryptography, Second Theory of Cryptography Conference, TCC 2005, Cambridge, MA, USA, Feb. 10-12, 2005, Proceedings, vol. 3378 of Lecture Notes in Computer Science, pp. 325-341. Springer, 2005.
Victor Costan and Srinivas Devadas. Intel SGX explained. IACR Cryptology ePrint Archive, 2016:86, 2016.
Ronald Cramer, Ivan Damg°ard, and Jesper Buus Nielsen. Multiparty computation from threshold homomorphic encryption. In Birgit Pfitzmann, editor, Advances in Cryptology—EUROCRYPT 2001, International Conference on the Theory and Application of Cryptographic Techniques, Innsbruck, Austria, May 6-10, 2001, Proceeding, vol. 2045 of Lecture Notes in Computer Science, pp. 280-299. Springer, 2001.
Stefan Dziembowski and Krzysztof Pietrzak. Leakage-resilient cryptography. In 49th Annual IEEE Symposium on Foundations of Computer Science, FOCS 2008, Oct. 25-28, 2008, Philadelphia, PA, USA, pp. 293-302. IEEE Computer Society, 2008.
Marcel Medwed, Francois-Xavier Standaert, Johann Großsch"adl, and Francesco Regazzoni. Fresh re-keying: Security against side-channel and fault attacks for low-cost devices. In Daniel J. Bernstein and Tanja Lange, editors, Progress in Cryptology—AFRICACRYPT 2010, Third International Conference on Cryptology in Africa, Stellenbosch, South Africa, May 3-6, 2010. Proceedings, vol. 6055 of Lecture Notes in Computer Science, pp. 279-296. Springer, 2010.
Moni Naor and Gil Segev. Public-key cryptosystems resilient to key leakage. SIAM J. Comput., 41(4):772-814, 2012.
Pascal Paillier. Public-key cryptosystems based on composite degree residuosity classes. In Jacques Stern, editor, Advances in Cryptology—EUROCRYPT '99, International Conference on the Theory and Application of Cryptographic Techniques, Prague, Czech Republic, May 2-6, 1999, Proceeding, vol. 1592 of Lecture Notes in Computer Science, pp. 223-238. Springer, 1999.
Marcus Volp, Adam Lackorzynski, Jeremie Decouchant, Vincent Rahli, Francisco Rocha, and Paulo Jorge Esteves Verissimo. Avoiding leakage and synchronization attacks through enclave-side preemption control. In Proceedings of the 1st Workshop on System Software for Trusted Execution, SysTEX@Middleware 2016, Trento, Italy, Dec. 12, 2016, pp. 6:1-6:6. ACM, 2016.
Sebastian Faust, Krzysztof Pietrzak and Joachim Schipper, Practical Leakage-Resilient Symmetric Cryptography, CHES 2012, International Associations for Cryptologic Research, 2012, 20 pgs.
Svetla Nikova, Christian Rechberger and Vincent Rijmen, "Threshold Implementations Against Side-Channel Attacks and Glitches", https://www.esat.kuleuven.be/cosic/publications/article-847.pdf; 2002, 17 pgs.
Sergiu Costea and Bogdan Warinschi. Secure software licensing: Models, constructions, and proofs. In IEEE 29th Computer Security Foundations Symposium, CSF 2016, Lisbon, Portugal, Jun. 27-Jul. 1, 2016, pp. 31-44. IEEE Computer Society, 2016.
Zhang, Mingwu et al., "Token-Leakage Tolerant and Vector Obfuscated IPE and Application in Privacy-Preserving Two-Party Point/Plynomial Evaluations", The Computer Journal, vol. 59, No. 4, 2016, 15 pgs.

\* cited by examiner

Experiment seUNF-CMA$_{\mathcal{A}}^{\text{DSIG}}(\lambda)$
  $(sk_s, pk_s) \leftarrow \text{KGen}_{sig}(1^\lambda)$
  $Q \leftarrow \emptyset$
  $(m^*, \sigma^*) \leftarrow \mathcal{A}^{\text{Sign}'(sk_s, \cdot)}(pk_s)$
    where oracle Sign' on input $m$:
      let $\sigma \leftarrow \text{Sign}(sk_s, m)$
      set $Q \leftarrow Q \cup \{(m, \sigma)\}$
      return $\sigma$
  return 1, if $\text{Verify}(pk_s, m^*, \sigma^*) = \text{true} \wedge (m^*, \sigma^*) \notin Q$
  return 0

FIG. 5

Experiment IND-CPA$_{\mathcal{A}}^{\Pi}(\lambda)$
  $(sk_{enc}, pk_{enc}) \leftarrow \text{KGen}_{enc}(1^\lambda)$
  $b \leftarrow \{0, 1\}$
  $(m_0, m_1, \text{state}_\mathcal{A}) \leftarrow \mathcal{A}(pk_{enc})$
  if $m_0 \notin \mathcal{M} \vee m_1 \notin \mathcal{M}$, let $c \leftarrow \bot$
  else, let $c \leftarrow \text{Enc}(pk_{enc}, m_b)$
  $a \leftarrow \mathcal{A}(c, \text{state}_\mathcal{A})$
  return 1, if $a = b$
  return 0

FIG. 6

METHOD FOR LEAKAGE-RESILIENT DISTRIBUTED FUNCTION EVALUATION WITH CPU-ENCLAVES

BACKGROUND

The present invention relates to the field of digital computer systems, and more specifically, to a method for using a secret key for cryptographically processing data item(s) in an enclave enabled system.

Computing functions using a secret on data has the problem that this secret may leak some information about itself, e.g., due to side-channel attacks or simple observation of computation. These side-channels allow to learn some information about the secret involved, which may, at some point, leak the complete secret to an attacker. Concrete examples of these side-channels are fault-attacks, power-analysis, malware, timing-attacks, and radiation. Therefore, there is a need for overcoming such issue.

SUMMARY

Various embodiments provide a method for using a secret key for cryptographically processing a data item in an enclave enabled system, a system component and a computer program product as described by the subject matter of the independent claims. Advantageous embodiments are described in the dependent claims. Embodiments of the present invention can be freely combined with each other if they are not mutually exclusive.

In one aspect, the invention relates to a method for using a secret key for cryptographically processing a data item in an enclave enabled system. The method comprises:
a) computing a first set of shares of the secret key and storing them in an encrypted format;
b) sending to each component in a first set of components a respective encrypted share;
c) in response to sending the encrypted shares, receiving from each of the components in the first set of components a modified encryption of the respective share;
d) decrypting each of the received modified encryptions and sending the resulting modified share to the respective first set of components;
e) in response to sending the decrypted modified shares, receiving from each of the first set of components a data item cryptographically processed using the respective share;
f) combining the received data items to obtain a cryptographically processed data item.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a system component having a leakage resilient decryption capability. The system component is configured for:
a) computing a first set of shares of the secret key and storing them in an encrypted format;
b) sending to each component in a first set of components a respective encrypted share;
c) in response to sending the encrypted shares, receiving from each of the components in the first set of components a modified encryption of the respective share;
d) decrypting each of the received modified encryptions and sending the resulting modified share to the respective first set of components;
e) in response to sending the decrypted modified shares, receiving from each of the first set of components a data item cryptographically processed using the respective share;
f) combining the received data items to obtain a cryptographically processed data item.

BRIEF DESCRIPTION OF THE SEVERAL VIEWS OF THE DRAWINGS

In the following embodiments of the invention are explained in greater detail, by way of example only, making reference to the drawings in which:

FIG. 5 shows a strong unforgeability experiment of a signature scheme of the present disclosure.

FIG. 6 shows a IND-CPA experiment of an encryption scheme of the present disclosure.

DETAILED DESCRIPTION

Figure 1:
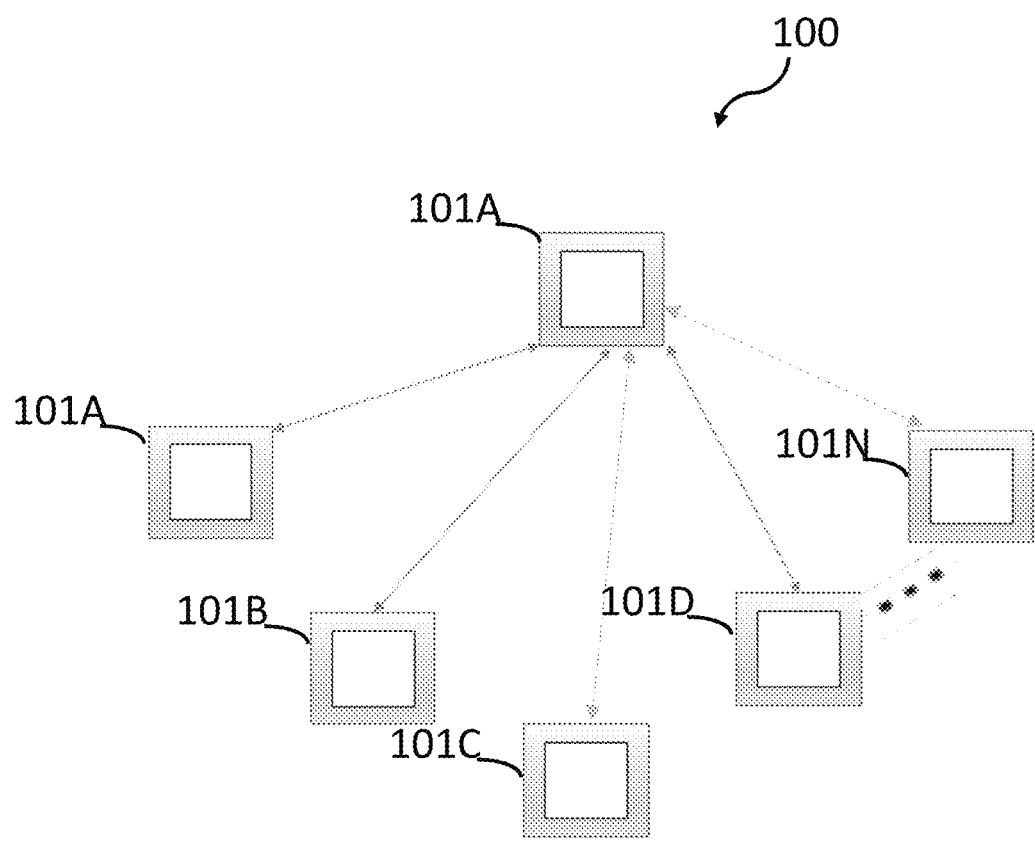
FIG. 1 illustrates an enclave enabled system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With the present method the complete secret key may not be reconstructed. The main entity or component that performs the method may use the secret key to perform a computation such as a signature multiple times with potentially different participants each time, on potentially different messages. However, the main entity may be corrupted (e.g. an adversary may see all computations, even the ones done in the enclave, but the attestation key of the enclave), and thus may learn the secret key. For that, the present method distributes the computation across multiple entities or components (e.g. VMs, Computers, or other processing devices as long as they have an enclave which supports verifiable computing), such that at least one entity may be honest, protecting the secret key, as the adversary only learns at most n−1 shares of the n shares of the secret key. Thus, if at least of one the entities remains honest, the secret key may not be revealed to the adversary.

The present method may enable to use several different components to apply a secret to some value, e.g., generating a signature on a message. The present method may be advantageous as it may provide a secure processing or handling of the secret key in particular, if at least one component of the system is not corrupted.

Steps b)-f) may be executed multiple times (multiple runs), wherein in each execution (or run) a different set of shares of the secret key may be used. The set of components that receive the shares may change from run to run, while the set of corrupted parties may also vary.

The encrypted format may be obtained by an additive homomorphic encryption. The homomorphic encryption is a form of encryption that allows computations to be carried out on ciphertext, thus generating an encrypted result which, when decrypted, matches the result of operations performed on the plaintext.

According to one embodiment, the method further comprises: re-sharing the secret key with the help of the first set of components, resulting in a second set of shares of the secret key in the encrypted format, for enabling a further usage of the secret key. The re-sharing step may for example be performed after step a) and before steps b)-f). For example, the re-sharing comprises re-computing the second set of shares or ciphertexts from the secret key. This may result in a new number of shares that may or may not equal to the number of shares of the previous iteration.

In another example, the shares of the secret key of the previous iteration may be completely randomized before any other execution of the method (e.g. steps b)-f)). Thus the shares can be re-randomized for each iteration of the method, while the secret key remains the same. The re-randomization may ensure that an adversary never learns the complete secret key, if not all components of the first or further sets of components are corrupted.

The re-sharing may be advantageous as it may enable using the same secret key multiple times in a secure manner. This may prohibit leaking the secret key over time in particular if the method is performed several times.

Assume for example there are three shares sh1, sh2, and sh3. For a first run 1 (or first execution of steps of the method) the first set of components may comprise three components P1, P2 and P3, where for example only P3 is honest or secure. There is a risk that sh1 and sh2 are revealed but sh3 is not revealed. Thus the whole secret is not revealed. However, if in a second run 2 (or a second execution of the steps of the method) a second set of components P1, P3 and P5 is used where only P3 is secure, but without performing the re-sharing (i.e. using the same shares sh1, sh2 and sh3) it may happen that sh3 is assigned to P5 and thus it may be revealed. In other terms after two runs the attacker can discover the secret key (in the first run sh1 and sh2 may be discovered and in the second run sh3 may be discovered). This embodiment may avoid this problem of secret discovery or leak over time as the re-sharing would also modify the shares.

For the first execution of the method the first set of shares may be the default shares, and the resulting second set of shares may be the default shares for a next iteration of the method such that for the next iteration the default shares may be used. For example, upon executing step f) by using the first set of shares as the defaults shares, the second set of shares may be configured to become the default shares.

According to one embodiment, the steps b)-f) are performed in response to determining that the re-sharing is successful. The re-sharing is performed before steps b)-f) of the current iteration (or current run), such that if the re-sharing fails (e.g., because of a crashed machine), the whole method may not be executed for the current iteration to avoid that for the next iteration the method does not start with the old shares more than one time. Using the shares more than one time, an adversary may learn all shares, and thus the secret key.

This embodiment may particularly be advantageous in case of multiple executions of the present method. This may ensure that a next execution or repetition of the present method would use different shares than the one used for the current execution of the method.

In case the re-sharing fails, steps a)-f) and the re-sharing step may be repeated.

According to one embodiment, the method further comprises repeating steps b)-f) using the second set of shares as the first set of shares and a second set of components as the first set of components. The second set of components may be the same as or different from the first set of components. The first and second set of components may comprise at least one component that is honest.

According to one embodiment, the re-sharing comprises generating the second set of shares of the secret key by appending to the respective shares of the first set of shares dummy values in the encrypted format. The use of a dummy value may allow to change the respective share such that it can be recovered in an efficient and systematic manner.

This embodiment may enable each component Pi of the system to get its secret share $x\_i$ of secret key x, but without making any other components of the system aware of the share $x\_i$ because the share may be randomized by the component Pi. Each component uses the homomorphic property of the encryption scheme, by adding a random number r to the share and later subtracting it. For example, an encrypted share may be noted as $Enc(x\_1)$. The decryption of the sum of encrypted share $x\_1$ and r results in $Dec(Enc(x\_1)+Enc(r))=x\_1+r$. Subtracting r from the result again yields $x\_1$. As r is a random element in the group, $x\_1+r$ is completely random for an outsider. Thus, only Pi learns $x\_i$. This may be advantageous because once the shares are re-randomized the main component may learn nothing about the shares. The plaintext may thus remain hidden although the encrypted shares can be known to the components (the decryption may be a blinded decryption).

According to one embodiment, the data item is a message, wherein the received cryptographically processed data item is a calculated signature from the message using the decrypted share, wherein the combining results in a signed message. The present method may enable to use the secret key for performing a computation e.g., a signature multiple times with potentially different sets of components each time, on potentially different messages.

According to one embodiment, steps b)-f) are performed in response to receiving a request to access the secret key. In another example, steps b)-f) may periodically be performed. This may provide multiple ways of triggering the method.

According to one embodiment, the method is performed at a selected component of the system wherein the shares are decryptable by the selected component only. The secret key is shared, while each share is encrypted to its own secret key and it is decryptable only by a decryption box of the selected component. This may further increase the secure aspect of the present method.

According to one embodiment, the re-sharing comprises: receiving from each component of the first set of components a respective modification; modifying each share of the first set of shares using the modifications, resulting in the respective share of the second set of shares; sending the second set of shares to respective second set of components.

According to one embodiment, each received modification comprising shares of zero in the encrypted format, wherein each share of zero is assigned to a component of the first set of components; appending to each share of the secret key that is sent to a given component shares of zero that are assigned to that given component.

These embodiments may enable a secure and systematic method for randomizing the shares of the secret key.

According to one embodiment, components of the system comprise connected computers via authenticated channels. An authenticated channel may be a secure channel for transferring data that is resistant to overhearing and/or tampering. This may further increase the secure aspect of the present method.

According to one embodiment, the method further comprises replacing the share of the first set of shares by the share of the second set of shares in each component of the second set of components comprising the share. This may save resources that would otherwise be required for identification of the right shares to be used among other shares.

According to one embodiment, the encrypted format being obtained by a homomorphic additive encryption method.

According to one embodiment, the modified encryption of an encrypted share is obtained by blinding the encrypted share using a blinding technique. This may avoid that an attacker can steal/see all shares at once, because the shares are blindly decrypted to protect against an attacker residing on the entity performing decrypting step d).

FIG. 1 illustrates an enclave enabled system 100.

The system 100 is enclave enabled means that one or more components of the system 100 are configured to use enclave technology to protect select code and data from disclosure or modification. The enclave technology may for example be Intel Software Guard Extensions (SGX) technology.

The enclave enabled system 100 comprises multiple components (or entities) 101A-101N (collectively referred to as 101). Each component of the components 101 may for example comprise a computer system or a virtual machine etc. the components 101 may be connected to each other via one or more networks. The networks may include local area networks (LANs) and/or wide area networks (WANs) (e.g., the Internet). The components 101 may be connected to each other via authenticated channels.

A component of the system 100 may be identified as a main component as it may be the only component of the system 100 that is configured to decrypt data in a given encrypted format. For example component 101A may be referred to as the main component. The encryption in the given encrypted format may be performed in each of the components 101.

Each output of the components 101A-N may be accompanied by a proof that the computation was performed honestly. This may be done by enforcing honest-but-curious behavior using attestation. For example, the attestation is checked for every message received to avoid trivial attacks. And a random number generator may be used as well for key generation.

The attestation may be an SGX enabled software attestation for enabling a remote component to read/load data at the enclave of another component e.g. as long as there is also the leakage resilient decryption component.

Figure 2:
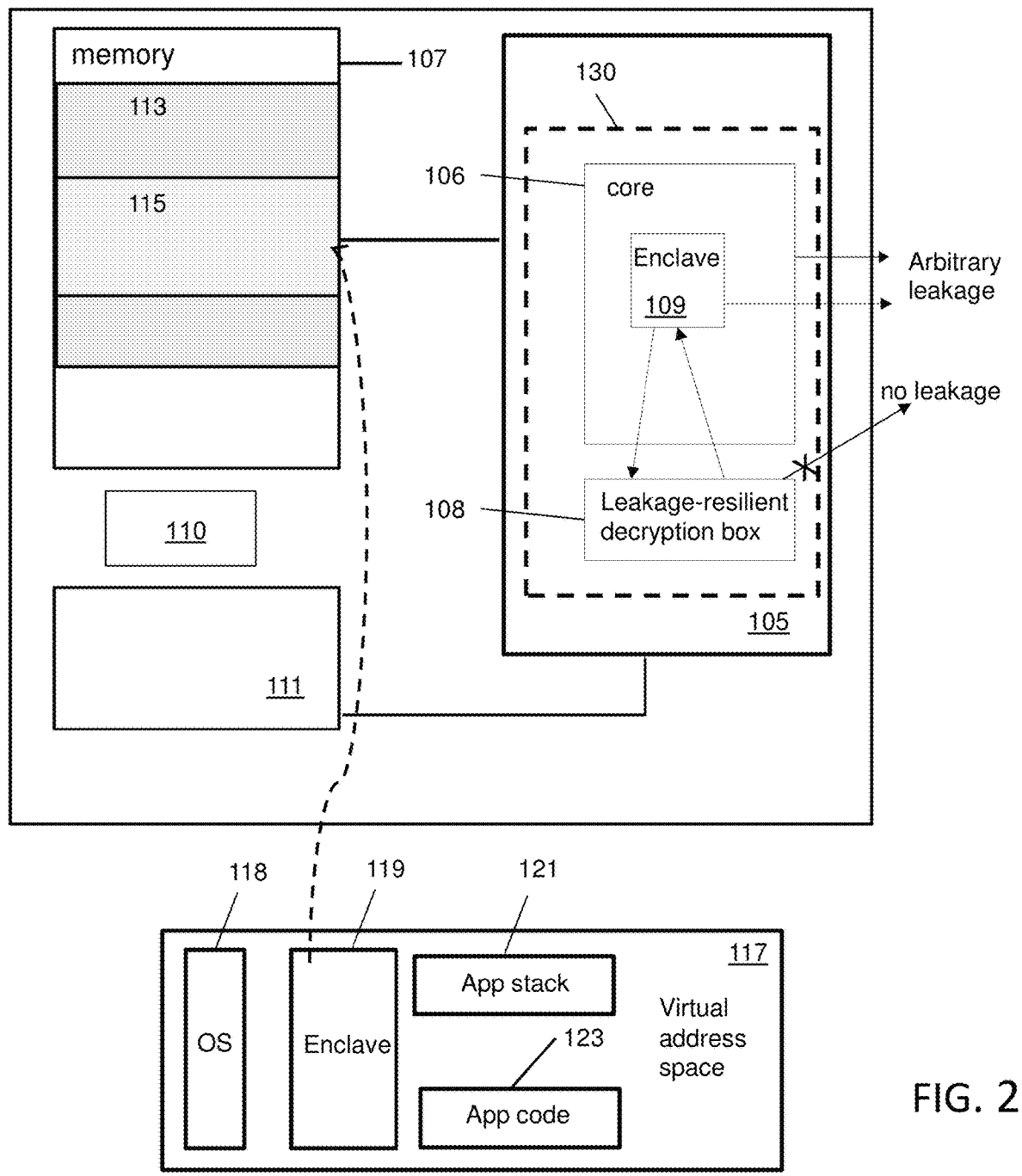
FIG. 2 depicts a block diagram of an example structure of a component of the enclave enabled system.

FIG. 2 depicts a block diagram of an example structure of a component (e.g. 101A) of the system 100.

Component 101A may be an enclave enabled processing device. Processing device 101A comprises a processor 105 (or processing unit), along with random access memory (RAM) 107, a network port 110, and one or more nonvolatile mass data storage devices such as a hard disk drive (HDD) 111 responsive to or coupled to processor 105. Processor 105 may include one or more processor cores. FIG. 2 shows for exemplification purpose a single core 106. The component 101A is assumed to have access to a semi-trusted CPU-enclave (such as SGX) illustrated by box 109, which may force correct execution, but any randomness, as well as any input values, may leak as indicated in FIG. 2.

Additional input/output (I/O) components (e.g., a keyboard, a display, etc.) may also be responsive to or coupled to processor 105. For example, the components of processor 105 may be packaged on a single integrated chip.

The processor 105 may support SGX features and thereby set aside a memory region, called the Processor Reserved Memory (PRM) 113, in the RAM 107. The processor 105 protects the PRM 113 from non-enclave memory accesses, including kernel, hypervisor and System Management Mode (SMM) accesses, and Direct Memory Accesses (DMA) from peripherals. The PRM 113 may be a continuous range of memory whose bounds are configured using a base and a mask register with the same semantics as a variable memory type range.

The PRM 113 may hold pages (e.g. 4 KB pages) that can be used to store enclave code and data. The pages of PRM 113 may be free pages. An operating system, which is untrusted, of the processing device 101A may be configured to assign free pages of the PRM 113 to enclaves rendering the assigned free pages enclave related pages. For example, each page belongs to exactly one enclave. FIG. 2 shows for exemplification purpose a single enclave 115.

An enclave is a protected memory area (e.g. that may be part of the core 106). Only the code residing within the enclave can access that memory area assigned to a process. Other code (including high-privileged OS) cannot modify but may read the code and randomness. When code is loaded in an enclave, the core 106 verifies the code and initial data before executing the enclave. Therefore, only authenticated code that was signed by a trusted origin may be executed, which, in this case, may be the present method which may be a distributed protocol involving a cryptographical processing of the data item. Thus, an adversary cannot just send the ciphertexts to decryption box 108, but has to run the code for learning the secret. The decryption box 108 may for example be a Trusted Platform Module (TPM) chip.

The initial code and data in the enclave 115 is loaded by the operating system. The processor 105 may be configured to copy data from unprotected memory (outside PRM) into the pages of the PRM 113, and assigns the pages to the enclave 115 being setup. It follows that the initial enclave state is known to the operating system. While the enclave is loaded, its contents may cryptographically be hashed by the processor 105. For example, the loaded initial code and data may be encrypted using a random key. The processor 105 may be configured to use a resilient leakage technic as provided by the box 108 in order to encrypt and/or decrypt the loaded data. The box 108 may for example be a leakage-resilient decryption box, which is configured to decrypt ciphertexts. This box 108 may be only accessible by the enclave (e.g. by the processor in the enclave mode), which can be enforced using, e.g., signed code. The secret key used by the present method for computation (e.g. of signature of a message) may be chosen beforehand or within the execution of the method e.g. as part of the method steps, is additively shared (modulo some group order), and encrypted under a public key of the decryption box 108, belonging to an additive encryption scheme.

After loading the initial code and data into the enclave 115, the enclave 115 may be initialized. After the time when the enclave 115 is initialized the enclave's code may be executed by an application process that has the enclave's pages mapped into its virtual address space.

FIG. 2 shows an example of a memory layout of a virtual address space 117 including an operating system (OS) 118, an enclave 119, an application stack 121 and application code 123. As illustrated in FIG. 2, the enclave 119 virtual memory is mapped to the enclave 115 of physical memory 107. Enclave 119 may for example include an entry table, an enclave heap, an enclave stack, and enclave code.

When executing the code inside the enclave 115, the processor 105 is in an enclave mode, and the code that it executes can access the pages that belong to the currently executing enclave 115. When the processor 105 is outside enclave mode, it bounces memory accesses inside the PRM 113. To access a page inside the enclave 115 the processor 105 may check if it is executing in enclave mode; if the page belongs to enclave 115 that the processor 105 is executing; and if the page accessed using the correct virtual address.

A security perimeter 130 may be defined by for example the core 106 and the decryption box 108. In another example, the security perimeter may be defined by the package boundary (the chip) of the processor 105. The security perimeter may be defined such that data and code are unencrypted inside the security perimeter. Data and code outside the security perimeter are encrypted. For example, decryption and integrity checks may be performed when the data is loaded inside the core 106.

The following definitions may be used in the description. $\lambda \in \mathbb{N}$ is a security parameter. s←A(y;k) denotes that s is assigned the output of algorithm A on input y and random coins k. Random coins k may be drawn internally, i.e., if k is dropped, k is drawn internally. $\{0, 1\}^*$ denotes the set of all strings of finite length.

Figure 3:
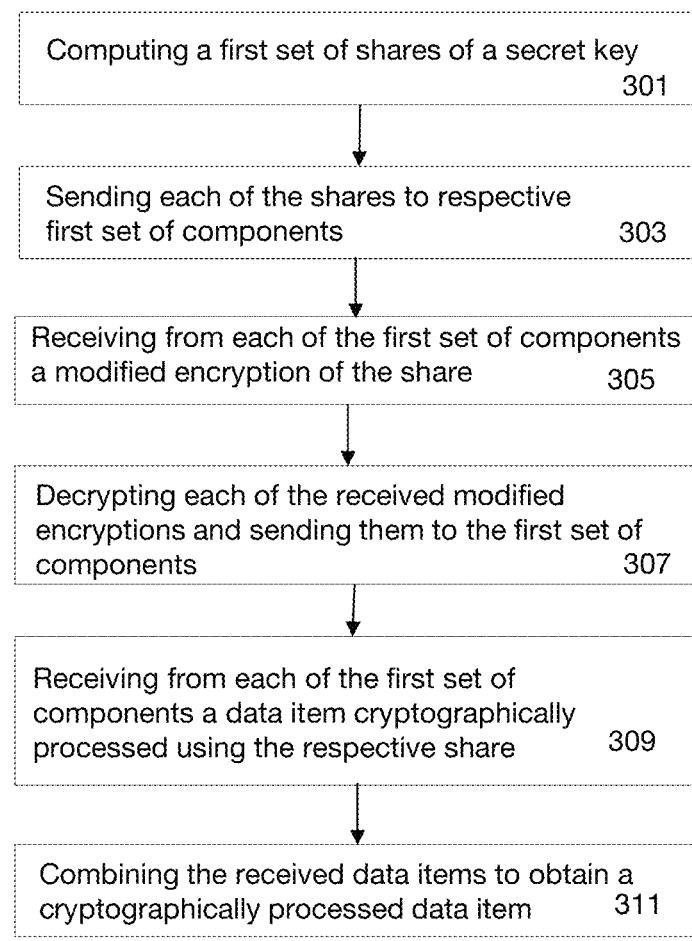
FIG. 3 is a flowchart of a method for using a secret key for cryptographically processing a data item in the enclave enabled system.

FIG. 3 is a flowchart of a method for using a secret key for cryptographically processing a data item in an enclave enabled system e.g. 100. The data item may for example be a message m. The data item may for example be stored in each component of the system 100. The secret key may for example be part of the enclave data of the main component 101A. The present method may for example be executed by a code that is an enclave code of the main component 101A. Keys including the secret key may be generated by the box 108. For example, the present method may be executed in an enclave mode of the core 106.

The cryptographical processing of the data item may for example be performed using a predefined signature scheme DSIG to generate a signature. The secret key may for example be the private key generated by the signature scheme DSIG.

For example, the signature scheme may be defined by a triple (KGensig, Sign, Verify) of probabilistic polynomial time (ppt) algorithms. The algorithm KGensig on input security parameter $\lambda$ outputs the public and corresponding private key: $(sk_s, pk_s)$ KGensig $(1^\lambda)$. The algorithm Sign gets as input the secret key $sk_s$, and the message m∈M and outputs a signature α←Sign($sk_s$, m). The algorithm Verify receives as input a public key $pk_s$ a message m and a signature σ and outputs a decision bit d∈{false, true} which has false or true value: d←Verify($pk_s$, m, σ). For example, the signature scheme may have a correctness property such that for all $\lambda \in \mathbb{N}$, for all $(sk_s, pk_s)$←KGensig($1^\lambda$), and for all m∈M, Verify($pk_s$, m, Sign($sk_s$, m))=true. The signature scheme may be secure, if it is correct and unforgeable. The signature scheme may be strongly unforgeable, such that an adversary A cannot (except with negligible probability) come up with any new valid signature σ* for a message m*. Moreover, the adversary A can adaptively query for new signatures. The signature scheme may for example be unforgeable under chosen message attacks (seUNF-CMA). For any efficient adversary A there exists a negligible function v such that $\Pr[seUNF\text{-}CMA_A^{DSIG}(1^\lambda)=1] \leq v(\lambda)$, where seUNF-CMA$_A^{DSIG}$ is defined in FIG. 5.

As suitable construction of the signature scheme DSIG may for example involve a Boneh-Lynn-Shacham (BLS) signature scheme, as follows:

KGensig($1^\lambda$) to draw $x \in \mathbb{Z}_q$ and return (x, [x]g2). The generated private key for signing is the secret key x: $sk_s$=x.

Sign($sk_s$, m) to return [x]H(m), where H: $\{0, 1\}^* \to G_1$ is a random oracle. H is a hash function modelled as a random local.

Verify($pk_s$, m, σ) to return e(σ, g2)=e(H(m), $pk_s$). e( ) is a bilinear mapping.

The signature scheme DSIG uses a bilinear mapping for verification as follows:

Let G1, G2 and GT be three cyclic additive groups with (prime) order q (e.g. the same prime as used for the encryption scheme described herein), generated by gi, i.e. Gi=<gi> for i∈{1, 2, T}. Let e: G1×G2→GT be a bilinear map such that:
1. Bilinearity: $\forall u \in G1, \forall v \in G2: \forall a, b \in \mathbb{Z}_q$: e([a]u, [b]v)=[ab]e(u, v).
2. Non-degeneracy: $\exists u \in G1, \exists v \in G2$: e(u, v)≠1, i.e., <e(g1, g2)>=gT.
3. Computability: There is an efficient algorithm that calculates the mapping e.

In step 301, main component 101A may compute a first set of shares of the secret key and store them in an encrypted format. The encrypted format may for example be obtained by a homomorphic additive encryption method. For example, the component 101A may share the secret key among the first set of shares and encrypt each share in the encrypted format.

For example, the secret key is secret-shared among m shares while each share is encrypted and thus being in an encrypted format resulting in encrypted shares c1, c2, . . . , cm. "ci" refers to an encrypted share i. For example, a public-key encryption scheme Π may be used. The public-key encryption scheme Π allows to encrypt data using a given public key $pk_{enc}$ so that the resulting ciphertext can be decrypted using the corresponding secret or private key $sk_{enc}$. For example, the public-key encryption scheme Π may for example consist of a triple (KGen$_{enc}$, Enc, Dec) of ppt algorithms such that: the algorithm KGen$_{enc}$ on input security parameter $\lambda$ outputs the private and public keys of the scheme as follows: $(sk_{enc}, Pk_{enc})$←KGen$_{enc}(1^\lambda)$. The algorithm Enc gets as input the public key $pk_{enc}$, the message m∈M, and outputs a ciphertext c: c←Enc($pk_{enc}$, m). The deterministic algorithm Dec on input a private key $sk_{enc}$, and a ciphertext c, outputs a message m∈M∪(⊥): m←Dec($sk_{enc}$, c).

The encryption scheme Π may for example be a semihomomorphic encryption scheme or a fully homomorphic encryption scheme (e.g. where multiplication may not used). For example, a homomorphism ⊕ may be defined as follows: C×C→C, where C is the set of ciphertexts, such that Dec($sk_{enc}$,⊕(Enc($pk_{enc}$, m), Enc($pk_{enc}$, m')))=m+m', where m and m' are in the message space, which may be $\mathbb{Z}_q$.

Using this homomorphism the decryption and addition of each share may provide the secret key: Dec($sk_{enc}$, $c_1$)+Dec ($sk_{enc}$, $c_2$)+ . . . +Dec($sk_{enc}$, $c_{n1}$)=x (mod q).

The encryption scheme Π may be IND-CPA secure. For example, for any ppt adversary A there exists a negligible function v such that $|\Pr[\text{IND-CPA}_A^\Pi(\lambda)=1]-\frac{1}{2}| \leq v(\lambda)$, where $\text{IND-CPA}_A^\Pi$ is defined in FIG. 6.

In step 303, main component 101A may send to each component of the first set of components 101B-M a respective encrypted share. For example encrypted share c1-cn1 may be sent to respective first set of components 101B . . . 101M. The encrypted shares may be randomly distributed over the first set of components.

For example, the main component 101A may be configured to select among the components 101 of the system 100 the first set of components 101B-M. The selection may for example be a random selection. The number of components in the first set of components may be equal to or smaller than the number of shares n1. If for example, the number of the first set of components is smaller than the number of shares n1 multiple shares may be sent to one or more components of the first set of components.

In response to sending the encrypted shares c1-cn1, the main component 101A may receive in step 305 from each of the components 101B-M of the first set of components a modified encryption of the respective share. The modified encryption may for example be obtained by encoding the encrypted share by the respective component in an encoded format. The encoded format may for example be obtained a blinding technique. For example, each receiving component 101B-M blinds its share ci with a random nonce ei. The share ci may be obtained in an encoded format by using the following calculation bi=Enc($pk_{enc}$, ei)⊕ci (encrypting the nonce ei and adding it to the share ci).

In step 307, the main component 101A may decrypt each of the received modified encryptions and send the resulting modified share ri to the respective first set of components. For example, the main component 101A decrypts the modifications bi of the shares ci resulting in ri which are sent back to the respective components 101B-M. Each of the first set of components 101B-M may then unblinds ri so as to obtain si (si←ri—ei) and signs the data item m using si to obtain σi←[si]H(m), and sends the resulting σi to the main component 101A. For example, the data item m is signed by each component of the first set of components using the respective share si which is the result of decryption of the encrypted share ci. However, the decryption is performed by the main component 101A.

The signature of the data item m may involve an encryption scheme that is additive homomorphism encryption e.g. encryption scheme Π described herein.

In response to sending the decrypted modified shares, the main component 101A may receive in step 309 from each of the first set of components a data item that is cryptographically processed (e.g. signature σi of data item m) using the respective share.

In step 311, the main component 101A may combine the received signed data items σi (or signatures σi) to obtain the data item m that is cryptographically processed or signed σ. Following the above example, the main component may calculate the σ←Σσi=Σ[si]H(m)=[x]H(m).

Algorithms KGensig and $\text{KGen}_{enc}$ may be executed by the decryption box 108. And the present method may be executed by instructions and data that are part of enclave code and enclave data of an enclave of the main component 101A. This may ensure that the decryption may not leak the secret (decryption) key to an adversary e.g. if the main entity is corrupt.

Figure 4:
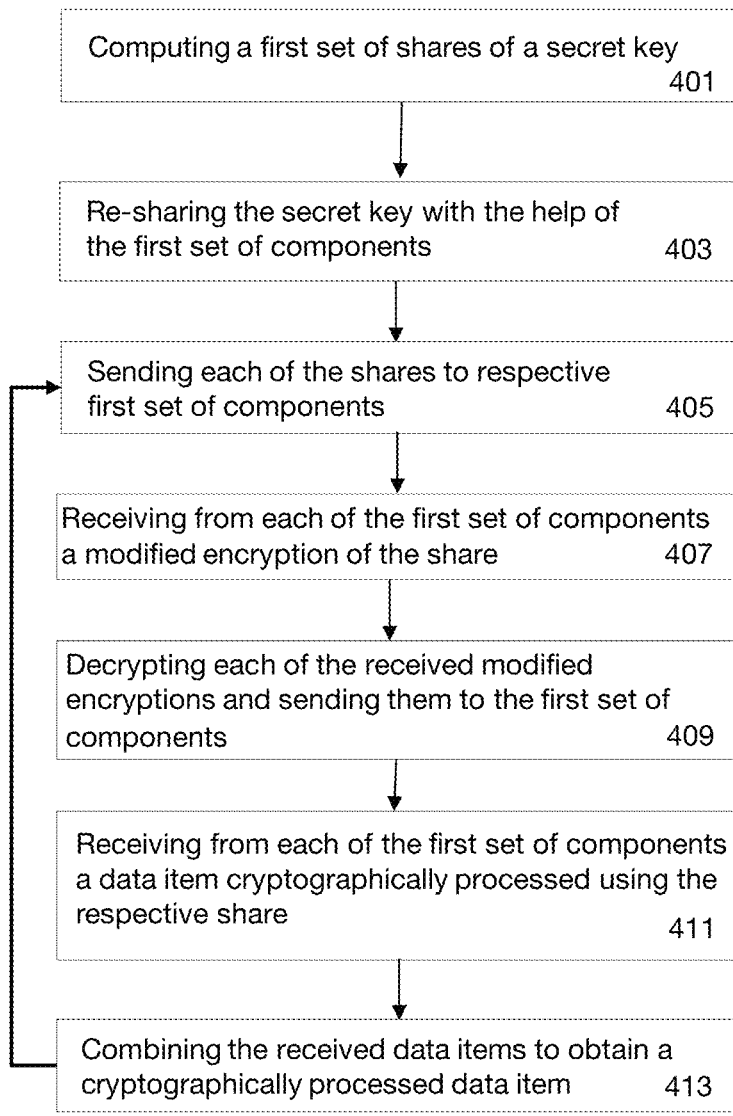
FIG. 4 is a flowchart of a method for multiple usage of a secret key for cryptographically processing one or more data items in the enclave enabled system.

FIG. 4 is a flowchart of a method for multiple usage of a secret key for cryptographically processing one or more data items in an enclave enabled system e.g. 100.

Step 401 is step 301.

In step 403, the main component 101A may re-share the secret key with the help of the first set of components 101B-M. This results in a second set of n2 shares of the secret key in the encrypted format. n2 may be equal or different from n1. The re-shared secret key may be useful for a further usage of the secret key. The re-sharing may for example be performed as described herein with reference to sub-protocol reshare. The second set of shares may for example be obtained by randomizing of the first set of shares to obtain n2 new ciphertexts which encrypt new plaintexts, but still result in the secret key if summed up mod some group order.

Steps 405-413 are steps 303-311 respectively.

The method further comprises repeating steps 405-413 using the n2 shares that result from step 403 and a second set of components instead of the first set of components. Step 403 may further comprise the selection of the second set of components by the main component 101A. The second set of components may or may not be different from the first set of components.

In one example a method for cryptographically processing a data item m may involve a protocol between multiple components or participants Pi, where P1 is the main component. P1 may for example use a secret x to compute something, e.g., a signature multiple times with potentially different participants each time, on potentially different messages. The protocol may be split into three parts or "sub"-protocols. The three sub-protocols may be referred to as "Setup", "Reshare" and "Signing" sub-protocols and may be described as follows.

Setup: there is a secret $x \in \mathbb{Z}_q$ which is secret-shared (additively) among n shares, while each share is encrypted under $pk_{enc}$, resulting in encrypted shares $c_1, c_2, \ldots, c_n$ such that $\text{Dec}(sk_{enc}, c_1)+\text{Dec}(sk_{enc}, c_2)+ \ldots +\text{Dec}(sk_{enc}, c_n)=x$ (mod q). The public key of the signature scheme is thus $pk_s=[x]g2$.

Reshare: to reshare the secret key x each participant Pj shares zero as follows $0=s'_{1,Pj}+s'_{2,Pj}+ \ldots s'_{n,Pj}$ additively (mod q) and encrypts each share using $pk_{enc}$, to generate $c'_{i,Pj} \leftarrow \text{Enc}(pk_{enc}, s'_{i,Pj})$. Then each $c'_{i,Pj}$ is sent to P1, which sets $c'=c_i \oplus c'_{i,P1} \oplus c'_{i,P2} \oplus \ldots \oplus c'_{i,Pn}$. This may randomize all shares.

Signing: To sign, each participant Pi takes its share ci, and blinds it with a random nonce ei, by calculating bi as follows bi←Enc(pkenc, ei)⊕ci, and sends bi to P1. P1 decrypts bi and sends the result ri to respective Pi. Pi then unblinds ri by letting si←ri–ei. Then, each party Pi lets σi←[si]H(m), and sends the result σi to P1. P1 then calculates σ←Σσi=Σ[si]H(m)=[x]H(m) the signature of the data item m.

The protocol is combined from the three subprotocols. First, P1 chooses the list of participants (P2, P3, . . . , Pn). Then, each share ci is given to Pi. Then, the resharing subprotocol is run as defined resulting in new shares be (c'i)1 . . . n. The participants for the re-sharing are not required to be same as in the signing subprotocol. And can be used for the next run of the protocol. If, and only if, the resharing subprotocol was successful, the signing subprotocol of the present iteration or run is executed with the old shares (ci). The signature σ is then output. If the second part of the protocol fails, the protocol may be restarted from the beginning, i.e., including re-sharing.

As shown in FIG. 5, an adversary may receive an honestly generated public key (the first line of the experiment). It can then receive signatures on its own choice. Its goal is to output a new (valid) signature under that generated pk which it has never seen.

For the encryption scheme illustrated in FIG. 6, an adversary receives an honestly generated pk, and then chooses two messages. One of them is encrypted, and the corresponding ciphertext is given to the adversary. It then has to decide which message was encrypted.

Various embodiments are specified in the following numbered clauses.

1. A method for using a secret key for cryptographically processing a data item in an enclave enabled system, the method comprising:
   a) computing a first set of shares of the secret key and storing them in an encrypted format;
   b) sending to each component in a first set of components a respective encrypted share;
   c) in response to sending the encrypted shares, receiving from each of the components in the first set of components a modified encryption of the respective share;
   d) decrypting each of the received modified encryptions and sending the resulting modified share to the respective first set of components;
   e) in response to sending the decrypted modified shares, receiving from each of the first set of components a data item cryptographically processed using the respective share;
   f) combining the received data items to obtain a cryptographically processed data item.

2. The method of clause 1, further comprising: re-sharing the secret key with the help of the first set of components, resulting in a second set of shares of the secret key in the encrypted format, for enabling a further usage of the secret key.

3. The method of clause 2, wherein the steps b)-f) are performed in response to determining that the re-sharing is successful.

4. The method of clause 2, further comprising repeating steps b)-f) using the second set of shares as the first set of shares and a second set of components as the first set of components.

5. The method of any of the preceding clauses 2-4, the re-sharing comprising generating the second set of shares of the secret key by appending to the respective shares of the first set of shares dummy values in the encrypted format.

6. The method of any of the preceding clauses, wherein the data item is a message, wherein the received cryptographically processed data item is a calculated signature from the message using the decoded and decrypted share, wherein the combining results in a signed message.

7. The method of any of the preceding clauses, wherein steps b)-f) are performed in response to receiving a request to access the secret key.

8. The method of any of the preceding clauses, being performed at a selected component of the system wherein the shares are decryptable by the selected component only.

9. The method of any of the preceding clauses 2-8, the re-sharing comprising:
   receiving from each component of the first set of components a respective modification;
   modifying each share of the first set of shares using the modifications, resulting in the respective share of the second set of shares;
   sending the second set of shares to respective second set of components.

10. The method of clause 9, each received modification comprising shares of zero in the encrypted format, wherein each share of zero is assigned to a component of the first set of components; appending to each share of the secret key that is sent to a given component shares of zero that are assigned to that given component.

11. The method of any of the preceding clauses, wherein components of the system comprises connected computers via authenticated channels.

12. The method of any of the preceding clauses 2-11, further comprising replacing the share of the first set of shares by the share of the second set of shares in each component of the second set of components comprising the share.

13. The method of any of the preceding clauses, the encrypted format being obtained by a homomorphic additive encryption method.

14. The method of any of the preceding clauses, the modified encryption of an encrypted share is obtained by blinding the encrypted share using a blinding technique.

15. A computer program product may include a computer-readable storage medium having computer-readable program code embodied therewith, the computer-readable program code configured to implement all of steps of the method according to any one of the preceding clauses.

16. An apparatus may include at least one processor having a leakage resilient decryption capability component, and at least one memory including computer program code, the at least one memory and the computer program code configured to, with the at least one processor, cause the apparatus at least to perform:
   a) computing a first set of shares of the secret key and storing them in an encrypted format;
   b) sending to each component in a first set of components a respective encrypted share;
   c) in response to sending the encrypted shares, receiving from each of the components in the first set of components a modified encryption of the respective share;
   d) decrypting each of the received modified encryptions and sending the resulting modified share to the respective first set of components;
   e) in response to sending the decrypted modified shares, receiving from each of the first set of components a data item cryptographically processed using the respective share;
   f) combining the received data items to obtain a cryptographically processed data item.

17. The apparatus of clause 16, wherein the at least one memory and the computer program code are configured to, with the at least one processor, cause the apparatus at least to perform the method as in any one of clauses 2-14

18. A system component having a leakage resilient decryption capability being configured for:
   a) computing a first set of shares of the secret key and storing them in an encrypted format;
   b) sending to each component in a first set of components a respective encrypted share;
   c) in response to sending the encrypted shares, receiving from each of the components in the first set of components a modified encryption of the respective share;
   d) decrypting each of the received modified encryptions and sending the resulting modified share to the respective first set of components;
   e) in response to sending the decrypted modified shares, receiving from each of the first set of components a data item cryptographically processed using the respective share;
   f) combining the received data items to obtain a cryptographically processed data item.

The system component of clause 18 being further configured to perform the method as in any one of clauses 2-14.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for using a secret key for cryptographically processing a data item in an enclave enabled system, the method comprising:
   a) computing a first set of shares of the secret key and storing them in an encrypted format;
   b) sending to each component in a first set of components a respective encrypted share;
   c) in response to sending the encrypted shares, receiving from each of the components in the first set of components a modified encryption of the respective share;
   d) decrypting each of the received modified encryptions and sending the resulting modified share to the respective first set of components;
   e) in response to sending the decrypted modified shares, receiving from each of the first set of components a data item cryptographically processed using the respective share;
   f) combining the received data items to obtain a cryptographically processed data item.

2. The method of claim 1, further comprising: re-sharing the secret key with the help of the first set of components, resulting in a second set of shares of the secret key in the encrypted format, for enabling a further usage of the secret key.

3. The method of claim 2, wherein the steps b)-f) are performed in response to determining that the re-sharing is successful.

4. The method of claim 2, further comprising repeating steps b)-f) using the second set of shares as the first set of shares and a second set of components as the first set of components.

5. The method of claim 2, the re-sharing comprising generating the second set of shares of the secret key by appending to the respective shares of the first set of shares dummy values in the encrypted format.

6. The method of claim 1, wherein the data item is a message, wherein the received cryptographically processed data item is a calculated signature from the message using the decoded and decrypted share, wherein the combining results in a signed message.

7. The method of claim 1, wherein steps b)-f) are performed in response to receiving a request to access the secret key.

8. The method of claim 1, being performed at a selected component of the system wherein the shares are decryptable by the selected component only.

9. The method of claim 2, the re-sharing comprising:
   receiving from each component of the first set of components a respective modification;
   modifying each share of the first set of shares using the modifications, resulting in the respective share of the second set of shares;
   sending the second set of shares to respective second set of components.

10. The method of claim 9, each received modification comprising shares of zero in the encrypted format, wherein each share of zero is assigned to a component of the first set of components; appending to each share of the secret key that is sent to a given component shares of zero that are assigned to that given component.

11. The method of claim 1, wherein components of the system comprises connected computers via authenticated channels.

12. The method of claim 2, further comprising replacing the share of the first set of shares by the share of the second set of shares in each component of the second set of components comprising the share.

13. The method of claim 1, the encrypted format being obtained by a homomorphic additive encryption method.

14. The method of claim 1, the modified encryption of an encrypted share is obtained by blinding the encrypted share using a blinding technique.

15. A computer program product comprising a computer-readable storage medium having computer-readable program code embodied therewith, the computer-readable program code configured to implement all of steps of the method according to claim 1.

16. An apparatus comprising:
   at least one processor having a leakage resilient decryption capability component, and
   at least one memory including computer program code,
   the at least one memory and the computer program code configured to, with the at least one processor, cause the apparatus at least to perform:
   a) computing a first set of shares of the secret key and storing them in an encrypted format;
   b) sending to each component in a first set of components a respective encrypted share;
   c) in response to sending the encrypted shares, receiving from each of the components in the first set of components a modified encryption of the respective share;
   d) decrypting each of the received modified encryptions and sending the resulting modified share to the respective first set of components;
   e) in response to sending the decrypted modified shares, receiving from each of the first set of components a data item cryptographically processed using the respective share;
   f) combining the received data items to obtain a cryptographically processed data item.

* * * * *